(12) United States Patent
Zabawskyj

(10) Patent No.: US 7,460,861 B2
(45) Date of Patent: Dec. 2, 2008

(54) REAL-TIME MOBILE CONFERENCING SOLUTION

(75) Inventor: Bohdan Zabawskyj, Woodbridge (CA)

(73) Assignee: Redknee Inc., Mississauga, Ontario (CA)

(*) Notice: Subject to any disclaimer, the term of this patent is extended or adjusted under 35 U.S.C. 154(b) by 1039 days.

(21) Appl. No.: 10/736,504

(22) Filed: Dec. 17, 2003

(65) Prior Publication Data

US 2005/0135279 A1     Jun. 23, 2005

(51) Int. Cl.
*H04M 3/42* (2006.01)

(52) U.S. Cl. ............... 455/416; 370/260; 370/312; 379/206.01

(58) Field of Classification Search ............... 370/260, 370/312; 455/416; 379/206.01
See application file for complete search history.

(56) References Cited

U.S. PATENT DOCUMENTS 5,987,318 A * 11/1999 Alperovich et al. ......... 455/416

* cited by examiner

*Primary Examiner*—Gerald Gauthier
(74) *Attorney, Agent, or Firm*—Katten Muchin Rosenman LLP

(57) ABSTRACT

An invention is disclosed which exists as part of a computer program product for enabling real-time multi-media communications and conferencing events between mobile subscribers; and additionally provides multi-cast server functionality for the real-time distribution of content (text messages, pictures, media (e.g. voice)) between said wireless participants/clients.

27 Claims, 1 Drawing Sheet

REAL-TIME MOBILE CONFERENCING SOLUTION

CROSS-REFERENCE TO RELATED APPLICATIONS

Patent application Ser. No. 10/307335 entitled "Improved method for implementing an Open Charging (OC) middleware platform and gateway system".

STATEMENT REGARDING FEDERALLY SPONSORED RESEARCH OR DEVELOPMENT

Not Applicable

REFERENCE TO A MICROFICHE APPENDIX

Not Applicable

BACKGROUND ART

None cited

REFERENCES CITED

None cited

TECHNICAL FIELD

The present invention relates generally to telecommunications network implementations for facilitating group (or peer-to-peer) communications; and in particular, to a real-time mobile conferencing solution.

SUMMARY OF THE INVENTION

The invention disclosed provides the relevant art for enabling real-time multi-media communications and conferencing events between mobile subscribers. Functionally then, the real-time mobile conferencing solution consists of a computer program product (CPP) encompassing like logical instructions, algorithms and advances to the art which enables real-time mobile conferencing, including mobile conference set-up and notification.

In one embodiment of the invention, a wireless subscriber ("client") dials a short code or a generic E.164 national number which is dedicated for the purpose of the conference service. The telecommunication is initially terminated to a front-end server which will collect the PIN (or in other embodiments, examine the MSISDN).

In order to minimize the number of ports associated with a front-end server, the art has been innovatively articulated to support a DP3 based approach which would direct calls to a front-end IVR system which would collect the PIN (accomplished using an Establish Temporary Connection command to the SSP). Upon receiving the PIN other elements of the computer program product which helps implement the real-time mobile messaging and conference solution would direct the call to the appropriate conference server.

In alternate embodiments, a mechanism has been developed for smaller configurations (where a single server would terminate traffic and link the person to the appropriate conference bridge by virtue of the received PIN information) to 'daisy-chain' servers/cards together so that the front end DP3/IVR approach is not required. (The maximum number of ports for any given bridge would remain a function of the termination card used and other such limitations of the state of the art).

Clients activate, configure and/or otherwise manipulate a conference bridge session using any one of the following mechanisms (or a combination thereof where applicable); web-based graphical user interface (GUI), IVR menu, SMS/USSD short codes (e.g. a USSD command specifying 5 ports for 2 hours returns a PIN code for a post-paid or pre-paid client ). Said mechanisms of course remain only bounded by the state of the art.

Other advancements to the art include the ability to, in the preferred embodiment, send an SMS (or e-mail) to individuals (identifiable by the MSISDN (or NAI)) that a conference bridge has been established; non-limiting details as the sponsor or originator of the conference bridge, its topic, and other such details (as PIN code) could be furnished in a like manner.

As well as the ability to outdial specific identified individuals (employing USSD commands as *XX#MISDN_to_be_outdialled# for instance), which remain particularly salient and noteworthy in 'Calling Party Pays' based environments (as per the billing mechanisms in place, an incremental charge would have to be applied to the originator or sponsor).

Indeed, the CPP has been articulated, in alternate embodiments, with the necessary logic and like art to automatically pre-screen incoming participants on the basis of the MSISDN (thereby avoiding use of PIN codes). However it is appreciated that PIN codes should be used in the preferred and exemplary embodiment and in practice as an individual could well be 'double booked' on various ongoing conferences.

In other instances, the invention may be utilized in concert with prepaid vouchers to pay for ad hoc conference bridge facilities on a per-use basis; automatic debiting from credit-cards or post-paid accounts may also be interfaced as required. Additionally, in further alternate embodiments, location based notification may be co-articulated with the invention, whereby an SMS is sent to (a) pre-specified list(s) within a configurable radius of the originator or sponsor.

DETAILED DESCRIPTION OF THE PREFERRED EMBODIMENTS

Figure 1:
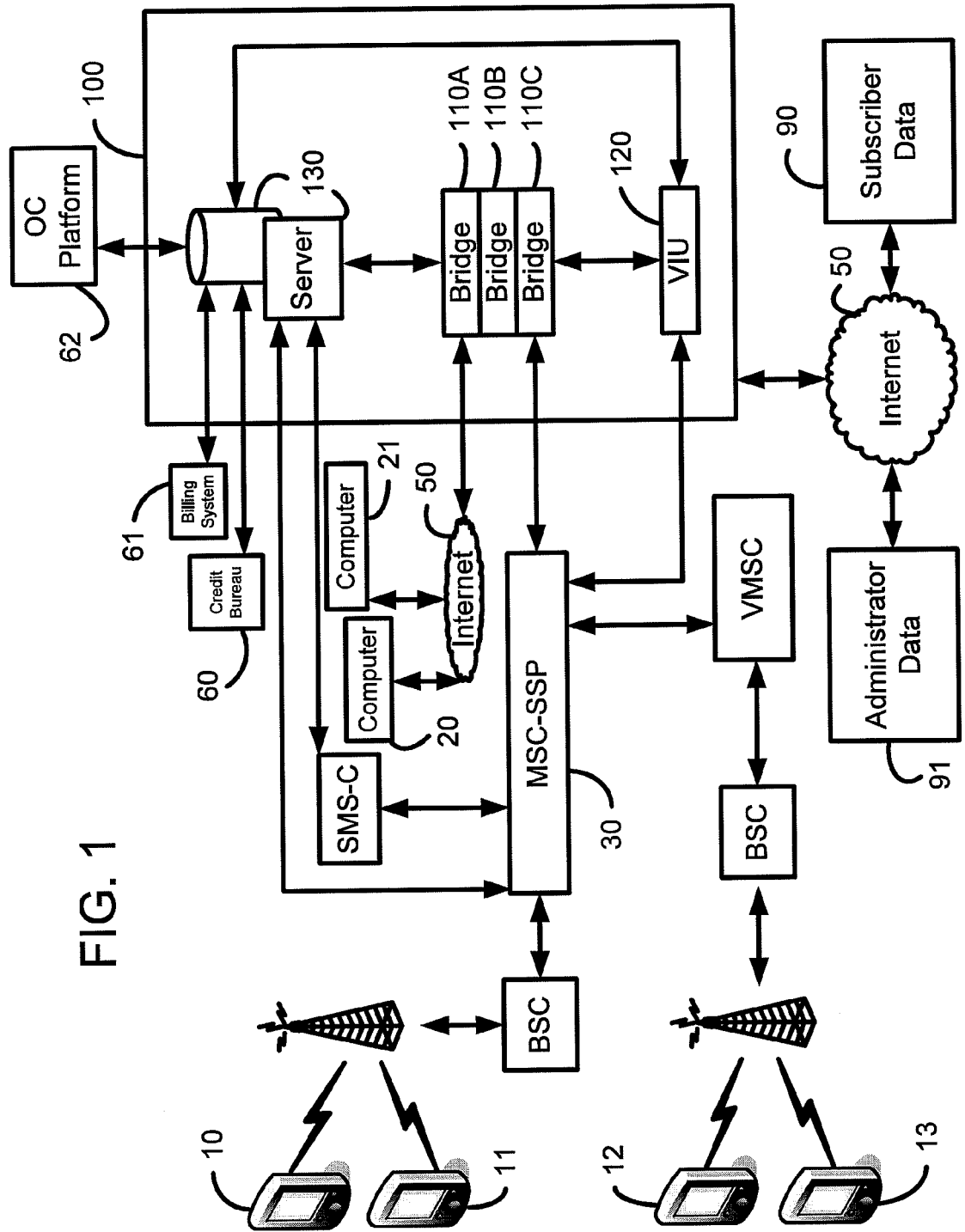
FIG. 1 illustrates a typical, non-limiting embodiment of the system level architecture employed in the disclosure of present.

Members skilled in the art will recognize that the ensuing represents an illustrative recital of the preferred embodiments of the invention of present and other embodiments may be articulated, gleaned and articulated from such while still remaining with in its spirit and scope. Indeed, equivalents found within the state of the art, and those which may reasonably and effectively be deemed equivalent in the future should also be understood as being incorporated by reference hereto and such. Furthermore, much of the language has been illustrative and is to be construed as expressly for pedagogical purposes in helping elucidate the art as concisely and beneficially as practical.

For simplicity and ease of instruction practitioners will recognize the totality of the real-time mobile conferencing solution consists of certain discrete elements of which the CPP form elements, but only when combined with other telecommunications and/or network elements does the full potency of the invention become apparent.

With reference now to FIG. 1, 130 represents the conferencing application server, which hosts the service logic and network interface modules (GSM-MAP USSD, CAMEL 2/GSM CS-1R, SMPP, SNMP) that enable the service logic and operations (including the conference database repository) required by that particular element of the invention articulated as part of a computer program product 100 (CPP). Technicians skilled in the art will also recognize that any number of protocols, triggers and interfaces may be employed herewith, and indeed, remain only bound by the state of the art and the reference to any one protocol (or similar rules, methods and means for the transmission of data) remains purely for the purposes of simplicity and ease of instruction, and do not serve to dilute the application and scope of the invention as such. Furthermore, the conferencing application 130 has been articulated to provide certain conferencing resource management capabilities, as determining the appropriate conference bridge resources 110A, 110B, 110C (as appropriate) (including resources in use, resources reserved, resources available) for the conference call; as well as certain call handling features as, admission/authorization/rejection based on conference ID/MSISDN/PIN combination, current number of participants in the call, monitoring of call duration, and call release of each connected participant when the conference call duration time is exhausted. It 130 also allocates said resources and instructs the MSC-SSP 30 to route the user call to that resource using existing INAP/IN/CAMEL technologies. Technicians skilled in the art will also recognize that any number of protocols, triggers and interfaces may be employed herewith, and indeed, remain only bound by the state of the art and the reference to any one protocol (or similar rules, methods and means for the transmission of data) remains purely for the purposes of simplicity and ease of instruction, and do not serve to dilute the application and scope of the invention as such. The Multimedia Voice Interface Unit (MVIU) 120 provides the requisite functionality for an interactive voice server which permits prompting and collecting of information from the caller, and playing voice announcements to the conference participants. The conference bridge server 110A, 110B, 110C remains a scaleable element of the invention 100 which provides a media server(s) capable of several simultaneous, multiparty audio conferences.

Certain elements of the invention (CPP) 100 may be provisioned through an articulated graphical user interface (likely web based 50), which may permit both administrators of the elements of the invention in question 100 to provision various operating commands and parameters 90; or subscribers to the conferencing solution may well provision/schedule their own conference information (and like data) 91.

Wireless subscribers 10, 11, 12, 13 may well access the conferencing functionality of the invention 100 directly, or may distinctly or simultaneously or in parallel access said invention 100 through their internet-enabled 50 computing devices (as laptops and such) 20. In the preferred embodiment such wireless subscribers 10, 11, 12, 13 and users of computer devices 20 would already have employed and be enjoying the functionality of computer program products articulated within said handsets which permit enjoyment of the invention's 100 multi-cast server functionality as well as the local storage and/or caching of multi-media. In alternate embodiments, some conference participants may well be accessing the functionality of those elements of the invention articulated as part of a computer program product 100 through external messaging clients from their internet-enabled 50 computing devices 21.

To satisfy billing concerns and needs, certain elements of the invention articulated as part of a computer program product 100 (and 130 in particular) may interface, with credit bureaus 60 and other external billing (or voucher) systems 61. The invention 100, may in alternate embodiments, be juxtaposed and co-articulated with an Open Charging (OC) middleware platform and gateway system 62 as detailed in patent application Ser. No. 10/307,335, for mediation with a prepaid or postpaid platform (for account decrement, balance inquiry and other similar purposes). Noble technicians skilled in the art will recognize that the invention of present need not be limited to the aforementioned Open Charging (OC) middleware platform and gateway system and other similar network implementations may be employed without diluting the intent and scope as such.

Continuing with reference to FIG. 1, in the instance where a first caller 10 dials the Service Access Number (SAN) assigned to the conference call service, the MSC-SSP 30 recognizes the dialed conferencing SAN and launches a query to the invention's 100 conference application server 130. The MSC-SSP 30 is then instructed to establish a connection with the MVIU 120. Whereupon after said MSC-SSP 30 and MVIU 120 connection is established, the conferencing application 130 instructs the MVIU 120 to play a welcome announcement to the caller ("Good Morning Mr. Hunt" for instance) and prompt for the conference # and PIN. The caller 10 (in this instance) enters the conference # and PIN, the collected digits are forwarded to the conferencing application 130. Upon successful validation of the conference # and PIN, the conferencing application 130 logically instructs the MVIU 120 to play an announcement to inform the caller that he/she will be placed in the conference ("Placing Mr. Hunt in IMF conference" for instance). The conferencing application 130 instructs the MSC-SSP 30 to terminate the MVIU 120 session and connect the caller to the conference bridge server 110A, 110B or 110C (as appropriate) (conference port # information is provided). The conferencing application 130 begins monitoring the conference time and conference events (additional caller admission, caller leaving the conference call, and so forth).

Still continuing with reference to FIG. 1, in another instance a new caller 11 (in this case) wishes to join an existing conference, by dialing the SAN assigned to the conference service. The MSC-SSP 30 recognizes the dialed conferencing SAN and launches a query to the conference application server 130. The MSC-SSP 30 is instructed to establish a connection with the MVIU 120. After the MSC-SSP 30 and MVIU 120 connection is established, the elements of the invention articulated as part of a computer program product 100 which relate to the conferencing application 130 instructs the MVIU 120 to play a welcome announcement ("Good Morning" for instance) to said caller 11 and prompt for the conference # and PIN. Said caller 11 dials the conference # and PIN. The collected digits are forwarded to the conferencing application 130 for validation.

After the conference # and PIN has been successfully validated. The MVIU 120 prompts the caller 11 for his/her name ("Mr. Phelps" for instance) and informs such caller 11 that he/she will be placed in the conference. After this announcement is played the MSC-SSP 30 is instructed to terminate the session with the MVIU 120. The conferencing application 130 also instructs the MVIU 120 to set up a UI session with the conference bridge server 110A, 110B or 110C (as appropriate) (referencing other caller's 10 (already in the conference) port number) in order to announce the arrival of said caller 11. The conferencing application 130 then instructs the MSC-SSP 30 to connect the caller to the conference bridge server 110A, 110B or 110C (conference port # information is provided). The MSC-SSP 30 notifies the invention's 100 conferencing application 130 of the successful call connection of the new caller 11. (Said new caller 11, joins the existing callers to the conference 10, 12, 13 or even 20 or 21). The conferencing application 130 continues monitoring the conference time and conference events (additional caller admission, caller leaving the conference call, etc).

Also in reference to FIG. 1, in the instance where there remains imminent prospect that the conference may be terminated owing to insufficient or dwindling funds, the conferencing application 130 detects that "x minutes" (e.g. 5 minutes) of conference time is remaining, and instructs the MVIU 120 to set up a UI session with the conference bridge server 110A, 110B or 110C (as appropriate) (referencing caller 10, 12, 13 or even 20 or 21's conference port). The MVIU 120 sets the UI session with the conference bridge server 110A, 110B or 110C (as appropriate). The conferencing application 130 requests that the MVIU 120 play a warning expiry announcement to the conference call participants 10, 11, 12, 13 and even 20 or 21 ("This conference will self-terminate in thirty (30) seconds" for instance). The MVIU 120 plays said announcement to the caller via the conference bridge server 110A, 110B or 110C (as appropriate). After which, each conference all participant 10, 11, 12, 13 (and even 20 or 21 if articulated properly), hears said 'expiration warning' announcement.

The architecture delineated by FIG. 1, combines mobile voice network capabilities with mobile messaging (SMS, USSD, MMS among others) and Web based technologies to simplify the set up of conference calls. Furthermore, allowing for a variety of payment options (including credit-card and vouchers to facilitate casual usage of the service). The art permits flexible conference call set up. The user or 'master' provides the conference date, start time, number of participants, list of participants' MSISDNs (optional), duration, and method of payment, and certain elements of the invention articulated as part of a computer program product (CPP2) 100 returns the Conference Call Service Access Number (configurable), conference ID, and PIN (optional). User receives conference details via SMS or e-mail notification. Aside from the expected telephony user interface based conferencing scheduling (by IVR announcements) or web-based provisioning interface for the setting of conference details, the invention also permits for an SMS based conference scheduling mechanism, whereby the master may schedule a conference call by entering the required set up information in an SMS Text Message (as the art advances beyond SMS, there remains much equivalence in applying the methodology to MMS and other such iterations); as well as a USSD based conferencing scheduling, which remains similar to the SMS conference scheduling mechanism, except herewith the master enters an USSD short code command with the required set up information (e.g. time, # of participants, etc.) and upon successful conference call scheduling, the master receives the conference call information in an USSD text response as well as a SMS message.

Other innovative elements of the art include, an automated dial out feature whereby certain elements of the invention articulated as part of a computer program product 100 "automatically" initiates conference call set up by attempting to connect with selected participants' MSISDN at the scheduled time. (A configurable message is played to the terminating party). There also remains the opportunity for a manual participant dial out, whereby the master (conference chair) initiates an outdial to conference-in an individual that s/he wishes to have join the conference. (This may be associated with a configurable incremental charge). Practitioners may well appreciate that this facilitates attendance by pre-paid subscribers in calling party pay jurisdictions.

The invention may notify conference participants of the conference details (together with conference reminders set in a configurable time period) by e-mail (provided said e-mail address was entered during the conference establishment process) or by SMS (mobile users whose MSISDNs were input during the conference call set up may receive an SMS text message with the conference information and/or that the conference is scheduled to begin in x-timeframe) or by USSD, MMS and other such messaging and notification technologies as taught by the state of the art.

The embodiments of the invention in which an exclusive property or privilege is claimed are:

1. A system for conferencing communication devices, comprising,
   at least one conference bridge for providing a multiparty audio conferencing session between the communication devices;
   a voice interface unit (VIU) enabled for:
      prompting and collecting of information from the communication devices;
      playing voice announcements; and
      receiving validation data from the communication devices via connections between said VIU and the communication devices, said VIU further enabled to forward said validation data to a validating entity; and
   a conference server enabled for:
      instructing a switching point to establish at least a first connection between said VIU and at least a first communication device such that said VIU may receive at least first validation data from at least said first communication device and forward said first validation data to said conference server, said switching point enabled to establish connections for the communication devices;
      validating said first validation data; and, in response to said validating said first validation data:
         instructing said switching point to terminate said first connection; and
         instructing said switching point to establish a second connection between said at least one conference bridge and said first communication device to establish said conferencing session.

2. The system of claim 1, wherein said conference server is further enabled for instructing said VIU to play at least one announcement over said first connection, prior to said instructing said switching point to terminate said first connection.

3. The system of claim 1, wherein said instructing said switching point to establish said first connection occurs in response to receiving a query from said switching point, the query generated in response to receiving a conference call service access number from said first communication device at said switching point.

4. The system of claim 1, wherein said instructing said switching point to establish said first connection occurs in response to a time being a scheduled time, said scheduled time being previously provisioned in a conference call setup.

5. The system of claim 4, wherein said conference call set up occurs via at least one of at least one SMS message, at least one USSD message, a web-based graphical user interface (GUI), and an interactive voice response (IVR) menu.

6. The system of claim 1, wherein said conference server is further enabled for:

instructing said switching point to establish at least a third connection between the VIU and at least a second communication device, such that said VIU may receive at least second validation data from at least said second communication device and forward at least said second validation data to said conference server;

validating at least said second validation data; and, in response to said validating at least said second validation data:

instructing said switching point to terminate at least said third connection; and instructing said switching point to establish at least a fourth connection between said at least one conference bridge and at least said second communication device such that at least said second communication device joins said conferencing session.

7. The system of claim 6, wherein said conference server is further enabled for instructing said VIU to set up a communication session with said at least one conference bridge to announce the arrival of at least said second communication device to said conferencing session.

8. The system of claim 1, wherein said conference server is further enabled for monitoring at least one of conference time and conference events.

9. The system of claim 1, wherein said conference server is further enabled for:

interfacing with at least one of a billing system and an open charging middleware platform for mediating with at least one of a prepaid platform and a postpaid platform, said interfacing for determining a remaining amount of funds for paying for said conferencing session;

detecting a remaining amount of conference time based on said remaining amount of funds; and instructing the VIU to set up a communication session with the conference bridge to play a warning expiry announcement in said conference session.

10. The system of claim 1, wherein said conference server is further enabled for instructing said switching point to dial out to at least a second communication device based on data received via said first connection, such that at least said second communication device joins said conference session.

11. The system of claim 1, wherein said validation data comprises at least one of a conference number and PIN (personal identification number).

12. The system of claim 1, wherein said validating entity comprises said conference server.

13. A conference server for controlling conferencing between communication devices, comprising, a service logic module enabled for validating validation data; and a network interface module enabled for:

instructing a switching point to establish at least a first connection between a voice interface unit (VIU) and at least a first communication device such that said VIU may receive at least first validation data from at least said first communication device and forward said first validation data to the conference server, said switching point enabled to establish connections for the communication devices; and, in response to validating said first validation data:

instructing said switching point to terminate said first connection; and instructing said switching point to establish a second connection between at least one conference bridge and said first communication device to establish a conferencing session.

14. The conference server of claim 13, wherein said validation data comprises at least one of a conference number and PIN (personal identification number).

15. The conference server of claim 13, wherein said validating entity comprises said conference server.

16. A method of conferencing communication devices in a system comprising a conference server, a voice interface unit (VIU) and at least one conference bridge, comprising, at the conference server, instructing a switching point to establish a first connection between the VIU and a first communication device, said switching point enabled to establish connections for the communication devices; at the VIU, receiving first validation data from said first communication device; and forwarding said first validation data to the conference server; and at the conference server, validating said first validation data; and, in response to said validating said first validation data:

instructing said switching point to terminate said first connection; and instructing said switching point to establish a second connection between the at least one conference bridge and said first communication device, to establish a conferencing session.

17. The method of claim 16, further comprising, at the conference server, instructing said VIU to play at least one announcement over said first connection, prior to said instructing said switching point to terminate said first connection.

18. The method of claim 16, wherein said instructing said switching point to establish said first connection occurs in response to receiving a query from said switching point, the query generated in response to receiving a conference call service access number from said first communication device at said switching point.

19. The method of claim 16, wherein said instructing said switching point to establish said first connection occurs in response to a time being a scheduled time, said scheduled time being previously provisioned in a conference call-setup.

20. The method of claim 19, wherein said conference call set-up occurs via at least one of at least one SMS message, at least one USSD message, a web-based graphical user interface (GUI), and an interactive voice response (IVR) menu.

21. The method of claim 20, further comprising at the conference server, instructing said switching point to establish at least a third connection between the VIU and at least a second communication device;

at the VIU, receiving at least second validation data from at least said second communication device; and forwarding at least said second validation data to the conference server; and at the conference server, validating at least said second validation data; and, in response to said validating at least said second validation data:

instructing said switching point to terminate at least said third connection; and instructing said switching point to establish at least a fourth connection between the at least one conference bridge and at least said second communication device such that at least said second communication device joins said conferencing session.

22. The method of claim 21, further comprising, at the conference server, instructing the VIU to set up a communication session with the at least one conference bridge to announce the arrival of at least said second communication device to said conferencing session.

23. The method of claim 16, further comprising, at the conference server, monitoring at least one of conference time and conference events.

24. The method of claim 16, further comprising, at the conference server,
- interfacing with at least one of a billing system and an open charging middleware platform for mediating with at least one of a prepaid platform and a postpaid platform, said interfacing for determining a remaining amount of funds for paying for said conferencing session;
- detecting a remaining amount of conference time based on said remaining amount of funds; and
- instructing the VIU to set up a communication session with the conference bridge to play a warning expiry announcement in said conference session.

25. The method of claim 16, further comprising dialing out to at least a second communication device based on data received via said first connection, such that at least said second communication device joins said conference session.

26. The method of claim 16, wherein said validation data comprises at least one of a conference number and PIN (personal identification number).

27. The method of claim 16, wherein said validating entity comprises said conference server.

* * * * *